United States Patent Office 3,257,193
Patented June 21, 1966

3,257,193
CONTROLLING VEGETATION WITH AZABICY-CLONONYLTHIO) AZOLES
John J. D'Amico, Dunbar, W. Va., assignor to Monsanto Company, St. Louis, Mo., a corporation of Delaware
No Drawing. Filed Aug. 13, 1965, Ser. No. 479,639
8 Claims. (Cl. 71—2.5)

This application is a continuation-in-part of application Serial No. 327,165, filed September 3, 1963, which latter application is a division of application Serial No. 180,829, filed March 19, 1962, now abandoned.

The present invention relates to a class of new chemical products which are at the same time azoles and 3-azabicyclo[3.2.2]nonanes. Although no class name exists for the new products they may be represented by the formula

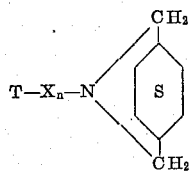

where T is the radical resulting from removing mercaptan hydrogen from an azole, X is sulfur or $CH_2$ and $n$ is zero or one. Suitable examples of azoles are 4-ethyl-2-mercaptothiazole,
4-methyl-2-mercaptothiazole,
4,5-dimethyl-2-mercaptothiazole,
4,5-diethyl-2-mercaptothiazole,
4-methyl-5-carboethoxy-2-mercaptothiazole,
4-methyl-5-carbomethoxy-2-mercaptothiazole,
4-carboethoxy-2-mercaptothiazole,
2-mercaptobenzothiazole,
4-ethyl-2-mercaptobenzothiazole,
4-methyl-2-mercaptobenzothiazole,
5-methyl-2-mercaptobenzothiazole,
5-ethyl-2-mercaptobenzothiazole,
6-methyl-2-mercaptobzenzothiazole,
7-methyl-2-mercaptobenzothiazole,
4-chloro-2-mercaptobenzothiazole,
5-chloro-2-mercaptobenzothiazole,
6-chloro-2-mercaptobenzothiazole,
4-methoxy-2-mercaptobenzothiazole,
5-ethoxy-2-mercaptobenzothiazole,
6-ethoxy-2-mercaptobenzothiazole,
4,5-dimethyl-2-mercaptobenzothiazole,
4,6-dimethyl-2-mercaptobenzothiazole,
4,6-dimethyl-7-chloro-2-mercaptobenzothiazole and
4,6-dimethyl-5,7-dichloro-2-mercaptobenzothiazole.

It will be appreciated that the compounds conforming to the aforesaid general formula are not necessarily equivalent and the properties and uses vary depending upon the values of T, X and $n$. In general, the new compounds accelerate the vulcanization of natural and synthetic rubbers. Where $n$ is zero the resulting sulfenamides are potent accelerators of the delayed action type. They combine a high degree of processing safety at temperatures only slightly below curing temperature with very rapid curing properties at vulcanization temperature. Green tread stocks containing the new sulfenamides as accelerators possess superior storage stability. Where X is methylene and $n$ is 1, the compounds retain strong accelerating action but the delayed action properties largely disappear. These methylene compounds possess biological activity and more particularly destroy undesirable vegetation upon application to foliage. In some instances biological activity was observed with the sulfenamides but these were rarely toxic to plants. However, some of them are toxic to microorganisms.

There is some question as to whether the methylene radical in the products from azole, formaldehyde and 3-azabicyclo[3.2.2]nonane is linked to nitrogen in the azole ring or to sulfur outside the ring. For example the mercaptobenzothiazole derivative may be represented as

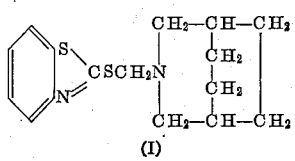

(I)

or

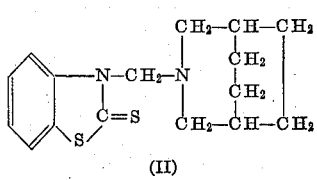

(II)

Evidence from ultra violet analysis indicates that essentially all the product is in the form of structure II but the invention is not limited to any theory of the precise configuration of the new compounds. It will be appreciated that T in the above formula when derived from mercaptobenzothiazole, for example by removing mercaptan hydrogen, may be either the benzothiazolylthio radical or its tautomer the benzothiazolinethione radical.

The following examples illustrate the invention including preparation of the new compounds but in no manner are to be construed as limitative. In these examples 3-azabicyclo[3.2.2]nonane is designated as "amine."

Example 1

A solution was prepared comprising 34.4 grams (0.2 mole) of 97% 2-mercaptobenzothiazole, 17 grams (0.21 mole) of 37% formaldehyde and 200 ml. of acetone. This solution was heated at 55–56° C. for one hour to effect solution. While continuing the stirring there was added to the solution at 25° C. in one portion 25 grams (0.20 mole) of amine. A precipitate formed immediately and the temperature rose from 25 to 42° C. The reaction mixture was stirred at 25–30° C. for two hours and then cooled to 0° C. The precipitate was collected by filtration and air-dried at 25–30° C. 3-(3-azabicyclo [3.2.2]non-3-ylmethyl)2-benzothiazolinethione was obtained in 98% yield. After recrystallization from alcohol the light tan solid melted at 134–136° C. Analysis gave 8.9% nitrogen and 21.3% sulfur compared to 9.2% nitrogen and 21.1% sulfur calculated for $C_{16}H_{20}N_2S_2$. The product was insoluble in heptane and water but soluble in ether, benzene, hot acetone and hot ethanol.

Example 2

Again proceeding as described in Example 1, 40.3 grams (0.2 mole) of 5-chloro-2-mercaptobenzothiazole was substituted for 2-mercaptobenzothiazole. The temperature rose from 25 to 35° C. upon addition of the amine. The solution was cooled to −5° C. before filtration. 3-(3-azabicyclo[3.2.2]non-3-ylmethyl) - 5-chloro-2-benzothiazolinethione was obtained in 34.2% yield as a cream solid. After recrystallization from alcohol it melted at 151–153° C. Analysis gave 8.2% nitrogen and 18.8% sulfur compared to 8.2% nitrogen and 18.9% sulfur calculated for $C_{16}H_{19}ClN_2S_2$. The product was insoluble in water and heptane but soluble in acetone, hot benzene, hot ethanol and slightly soluble in ether.

Example 3

A solution comprising 50.8 grams (0.25 mole) of ethyl 2-mercapto-4-methyl-5-thiazolecarboxylate, 400 ml. of isopropyl alcohol and 47 grams (0.375 mole) of amine was stirred and heated at 45–50° C. for one hour, then cooled to 45° C. and 197 ml. (0.375 mole) of sodium hypochlorite solution containing 14.28 grams hypochlorite per 100 ml. added dropwise at 45–50° C. over a period of two hours. The solution was held at 45–50° C. for another hour and then 5 grams of sodium sulfite and 1000 ml. of water added. After cooling to 10° C., the precipitate was collected by filtration, washed with water until neutral to litmus and air-dried at 25–30° C. Ethyl 2-(3-azabicyclo[3.2.2]non-3-ylthio)-4-methyl-5-thiazolecarboxylate was obtained in 97% yield as a cream solid. After recrystallization from heptane it melted at 66–67° C. Analysis gave 8.6% nitrogen and 19.3% sulfur compared to 8.6% nitrogen and 19.6% sulfur calculated for $C_{15}H_{22}N_2O_2S_2$. It was soluble in ether, acetone, benzene, heptane and ethanol.

Example 4

A solution comprising 32.8 grams (0.25 mole) of 4-methyl-2-mercaptothiazole, 300 ml. of isopropyl alcohol and 47 grams (0.375 mole) of amine was stirred and heated at 45–50° C. for one hour. Thereupon there was added below the surface at 45–50° C. over a two hour period 197 ml. (0.375 mole) of sodium hypochlorite solution containing 14.28 grams hypochlorite per 100 ml. The temperature was held at 45–50° C. for an additional hour and then 5 grams of sodium sulfite and 1000 ml. of water added. After cooling to 25° C. the reaction mixture was extracted with 400 ml. of ethyl ether, the ether solution washed with water until neutral to litmus and dried over sodium sulfate. The ether was removed in vacuo at a maximum temperature of 30°C./1–2 mm. An oily solid resulted in 97.5% yield. After recrystallization from ethyl alcohol, 3-(4-methyl-2-thiazolylthio)-3-azabicyclo[3.2.2]nonane was obtained as a tan solid melting at 69–70° C. The yield of the purified product was 51.7%. It contained 11.1% nitrogen and 24.7% sulfur compared to 11.0% nitrogen and 25.2% sulfur calculated for $C_{12}H_{18}N_2S_2$. Solubilities were similar to the product of Example 3.

Example 5

In the procedure of Example 3, 41.6 grams (0.125 mole) of 2,2′-dithiobis benzothiazole was substituted for the thiazole of that example and 123 ml. (0.225 mole) of sodium hypochlorite solution containing 13.6 grams hypochlorite per 100 ml. added dropwise at 45–50° C. over a two hour period. After isolating the product as described it was air-dried at 50° C. 3-(2-benzothiazolylthio)-3-azabicyclo[3.2.2]nonane was obtained in 99% yield as a light tan solid. After recrystallization from heptane it melted at 98–99° C. Analysis gave 9.3% nitrogen and 22.1% sulfur compared to 9.7% nitrogen and 22.1% sulfur calculated for $C_{15}H_{18}N_2S_2$. The product was insoluble in water and heptane, soluble in acetone and benzene and slightly soluble in ether and ethanol.

Example 6

A charge comprising 87.2 grams (0.3 mole) of the product of Example 5, 9.6 grams of sulfur, 37.2 grams (0.3 mole) of amine and 300 ml. of ethyl alcohol was heated at refluxing temperature (75–80° C.) for two hours. The stirred solution was then cooled to 0° C. and 100 ml. of heptane added. After maintaining the product at −10 to 0° C. for an hour, the precipitate was collected by filtration aid air-dried at 25–30° C. 3-(2-benzothiazolyldithio)-3-azabicyclo[3.2.2]nonane was obtained in 95.5% yield as a light yellow solid. After recrystallization from alcohol it melted at 113–115° C. Analysis gave 8.4% nitrogen and 29.9% sulfur compared to 8.7% nitrogen and 29.8% sulfur calculated for $$C_{15}H_{18}N_2S_3$$

The product was insoluble in water but soluble in ether, acetone, benzene and hot ethanol and slightly soluble in hot heptane.

Herbicidal activity of the compounds was illustrated by application to the foliage of grasses and broadleaved plants. The toxicant was dispersed in water and the dispersion containing 0.5% of active ingredient shown in the table below was applied as a spray to the foliage and the effect on the plants recorded. A rating of 0 indicates no phytotoxicity, 1 slight phytotoxicity, 2 moderate phytotoxicity, 3 severe phytotoxicity and 4 plants dead. The plants are represented in the table by letters as follows:

A. Morning glory
B. Wild oat
C. Brome grass
D. Rye grass
E. Mustard (radish)
F. Beet-sugar
G. Foxtail
H. Crab grass
J. Pigweed
K. Soybean
L. Wild buckwheat
M. Tomato
N. Sorghum

TABLE I

| Active Ingredient | Phytotoxicity Rating |||||||||||||
|---|---|---|---|---|---|---|---|---|---|---|---|---|---|
| | A | B | C | D | E | F | G | H | J | K | L | M | N |
| Product of Example 1 | 1 | 1 | 0 | 1 | 3 | 4 | 3 | 3 | 4 | 1 | 0 | 1 | 0 |
| Product of Example 2 | 1 | 3 | 1 | 1 | 3 | 4 | 3 | 2 | 4 | 1 | 4 | 4 | 1 |
| Product of Example 6 | 1 | 1 | 2 | 4 | 4 | 2 | 2 | 3 | 4 | 0 | 1 | 2 | 1 |

It was further found that the product of Example 2, namely 3-(3-azabicyclo[3.2.2]non-3-ylmethyl)-5-chloro-2-benzothiazolinethione, still killed pigweed at a solution concentration of 0.1%. The products of Examples 3 and 5 were toxic to mosquito larvae at a concentration of 10 parts per million and the product of Example 4 was found to be a repellent against army worm.

The toxicants are preferably applied in conjunction with a herbicidal adjuvant as carrier containing the active ingredient in a concentration within the range of about 0.1%–50.0% by weight. The active ingredients are soluble in common organic solvents as indicated above. It is therefore convenient to prepare a solution concentrate and disperse the solution in water to form an aqueous spray. Admixture with a small amount of an organic surface active agent capable of lowering the surface tension of water is preferred. Examples of surface active agents variously known as dispersing agents, wetting agents or emulsifying agents comprise soft or hard potassium soaps, morpholine or dimethylamine oleate, sulfonated fish, castor and petroleum oils, sodium salt of lignin sulfonic acid, alkylated aromatic sodium sulfonates, such as decylbenzene sodium sulfonate, dodecylbenzene sodium sulfonate, butyl or other amine salt of decyl or dodecylbenzene sulfonic acid, sodium lauryl sulfate, disodium monolauryl phosphate, ethylene oxide condensation products of alkyl phenols, as for example octyl phenol, ethylene oxide condensation products of tall oil, ethylene oxide condensation products of higher alcohols or higher mercaptans. Mixtures of two or more surface active agents are also feasible. Generally, the surface active agent will comprise only a small proportion of the composition, say 0.1–15% by weight of the toxicant.

The formulation of dry compositions for application as dusts or for further dilution with liquid carriers is readily accomplished by mixing the toxicant with a finely divided carrier. The latter will usually be in major proportions. Suitable carriers comprise talc, clay, pyrophyllite, silica, fuller's earth, diatomaceous earth and flours such as walnut shell, wheat, soya bean and cottonseed flours. Magnesium or calcium carbonate and calcium phosphate are suitable solid carriers. Adsorption on inert granules such as granular forms of fuller's earth provide effective forms more convenient to apply and use than dusts.

It is intended to cover all changes and modifications of the examples of the invention herein chosen for purposes of disclosure which do not constitute departures from the spirit and scope of the invention.

What is claimed is:

1. A herbicidal composition comprising a major proportion of a carrier, a minor phytotoxic proportion of a compound of the formula

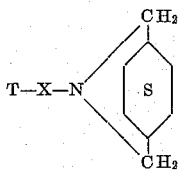

where T is the radical resulting from removing mercaptan hydrogen from a thiazole selected from the group consisting of 2-mercaptobenzothiazole and 5-chloro-2-mercaptobenzothiazole and X is selected from a group consisting of sulfur and methylene, and a small amount of surface active agent capable of lowering the surface tension of water.

2. A herbicidal composition comprising a major proportion of a carrier, a minor phytotoxic proportion of 3-(3-azabicyclo[3.2.2]non-3-ylmethyl) - 5 - chloro-2-benzothiazolinethione and a small amount of surface active agent capable of lowering the surface tension of water.

3. A herbicidal compositon comprising a major proportion of a carrier, a minor phytotoxic proportion of 3-(3-azabicyclo[3.2.2]non - 3 - ylmethyl) - 2 - benzothiazolinethione and a small amount of surface active agent capable of lowering the surface tension of water.

4. A herbicidal composition comprising a major proportion of a carrier, a minor phytotoxic proportion of 3-(2 - benzothiazolyldithio) - 3 - azabicyclo[3.2.2]nonane and a small amount of surface active agent capable of lowering the surface tension of water.

5. A method of controlling vegetation which comprises applying to the foliage thereof a phytotoxic concentration of a compound of the formula

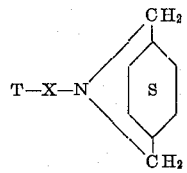

where T is the radical resulting from removing mercaptan hydrogen from a thiazole selected from the group consisting of 2-mercaptobenzothiazole and 5-chloro-2-mercaptobenzothiazole and X is selected from a group consisting of sulfur and methylene.

6. A method of controlling vegetation which comprises applying to the foliage thereof a phytotoxic concentration of 3 - (3 - azabicyclo[3.2.2]non-3-ylmethyl)-5-chloro-2-benzothiazolinethione.

7. A method of controlling vegetation which comprises applying to the foliage thereof a phytotoxic concentration of 3-(3-azabicyclo[3.2.2]non - 3 - ylmethyl) - 2 - benzothiazoline.

8. A method of controlling vegetation which comprises applying to the foliage thereof a phtotoxic concentration of 3-(2-benzothiazolyldithio)-3-azabicyclo[3.2.2]nonane.

References Cited by the Examiner

UNITED STATES PATENTS

| | | | |
|---|---|---|---|
| 2,769,010 | 10/1956 | D'Amico | 71—2.5 X |
| 2,776,977 | 1/1957 | D'Amico | 71—2.5 X |
| 3,069,429 | 12/1962 | Godson et al. | 71—2.5 X |
| 3,187,000 | 6/1965 | D'Amico | 71—2.5 X |

LEWIS GOTTS, *Primary Examiner.*

JAMES O. THOMAS, Jr., *Assistant Examiner.*